Jan. 2, 1968   J. J. SAIA   3,360,848
PROCESS FOR EXPLOSION-BONDING METALS
Filed Oct. 17, 1966   2 Sheets-Sheet 1

INVENTOR
JOSEPH J. SAIA

BY
ATTORNEY

INVENTOR
JOSEPH J. SAIA

BY

ATTORNEY

United States Patent Office

3,360,848
Patented Jan. 2, 1968

3,360,848
PROCESS FOR EXPLOSION-BONDING METALS
Joseph J. Saia, Passaic, N.J., assignor to E. I. du Pont de Nemours and Company, Wilmington, Del., a corporation of Delaware
Filed Oct. 17, 1966, Ser. No. 587,299
6 Claims. (Cl. 29—470)

The present invention relates to an improved method of cladding metals by means of explosives.

In recent years processes have been developed for metallurgically bonding metal layers by means of explosives. Such processes generally comprise bonding at least two metal layers by positioning the layers with a small space or standoff therebetween, providing a layer of explosive adjacent the outer surface of at least one of the outermost metal layers in the layup, and initiating the explosive to drive the surfaces to be bonded together progressively. Such cladding processes are described in more detail in U.S. Patents 3,137,937, 3,233,312, and 3,264,731 which are incorporated herein by reference.

In the foregoing processes a means is needed to maintain the standoff between layers with a minimum of variation when subjected to normal handling conditions during and after assembling of the layers, especially with those products having the area and thickness encountered in large-scale operations. The standoff means also must confer the necessary support strength without at the same time representing a barrier which interferes with the collision of the layers or introducing into the bonded zone a material which deleteriously affects the properties of the clad composite.

Various means have been used heretofore for maintaining a standoff between metal layers during explosion cladding operations. Outside support blocks or container walls abutting the ends of the layers as well as external supports such as metal rods welded to the outside surfaces of the metal layers at various points are unsatisfactory for large assemblies where the layers may bow under their own weight or by outside force. Internal supports between the layers have comprised (a) small projections or protrusions in the surface of either of the layers to be bonded or (b) metallic materials introduced between the layers along the areas to be bonded. The use of projections causes disturbances which often produce undesirable results. In addition, it becomes increasingly difficult to impress projections into the metal layers as the layers become thicker. Solid metal powder particles of the desired diameter have been used to maintain standoff, the metal in such cases becoming entrapped or occluded in the bond zone. The number and size of particles required to provide the required standoff, however, often are such that a considerable mass of foreign material is introduced into the bond zone, sometimes with harmful effect on the strength of the bond. A superior kind of metal standoff is afforded by thin metal ribbons deformed into a sine wave, zig zag or twisted configuration standing "on edge" between the metal layers. This technique, described in detail in U.S. Patent 3,205,574, is preferred to the metal particle standoff method since the thin ribbons introduce less foreign material into the bond zone and can be fixed in position, whereas the metal powders shift position when the assembly is handled. The technique is a time-consuming one, however, both with respect to the preparation of the deformed ribbons and their assembling and affixing to the metal layer(s).

It now has been found that metal surfaces which are to be bonded together by propelling said surfaces together progressively with an explosive can be supported internally in spaced-apart relationship by interposing rigid foamed plastic between the metal surfaces. The foamed plastic provides reliable standoff while surprisingly being progressively consumed during the cladding process and not causing non-bonding. It does not interfere with the collision of the layers and affords a uniform bond geometry without entrapment or occlusion of foreign material.

The term "rigid foamed plastic" as used herein denotes an expanded or cellular plastic having a compressive strength of at least about 5 pounds per square inch at a density of 12 pounds per cubic foot or less when measured by ASTM test D–1621–64.

The rigid foamed plastic can form one substantially continuous layer interposed between the metal layers over a major or minor part of the facing surfaces thereof, e.g., at interior parts of the surfaces or at interior and peripheral portions; or a continuous layer at the peripheral portions only, e.g., toward the edges of plates or toward the ends of cylindrical surfaces. Preferably, however, the foamed plastic is discontinuous, i.e., it comprises a plurality of discrete bodies or pieces of foamed plastic arranged in the space between the metal layers at intervals, particularly with larger-size metal layers to be bonded.

For a more complete understanding of the invention, reference is now made to the attached drawings wherein like numerals are used to denote like elements, and wherein.

Figure 1:
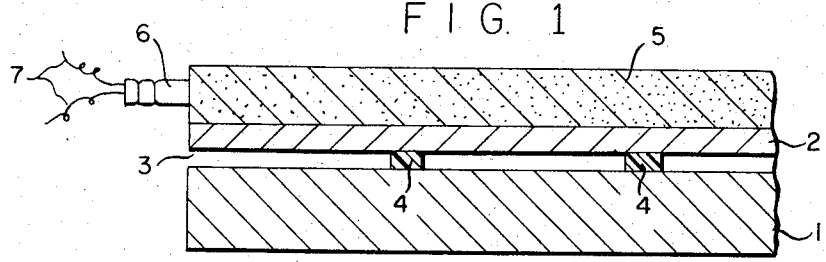
FIGURE 1 is a cross-sectional view of a portion of an assembly which can be used to practice the present invention.

In FIGURE 1, metal backer plate 1 and metal cladder plate 2 are parallel to one another and spaced apart so as to provide a standoff 3. The standoff is maintained by strips or disks 4 made of a rigid foamed plastic, e.g., polystyrene or polyurethane, spaced apart from each other. A layer of explosive 5 is adjacent the surface of metal plate 2 opposite the surface thereof facing metal plate 1. The weight of cladder plate 2 and explosive layer 5 exert a compressive load on standoff strips or disks 4. Explosive layer 5 is initiated by electric blasting cap 6 having lead wires 7 leading to a source of electricity. Upon initiation of explosive layer 5, plate 2 is propelled against plate 1 and collides progressively therewith as the detonation progresses through layer 5, the collision velocity being equal to the detonation velocity of explosive layer 5.

Figure 2:
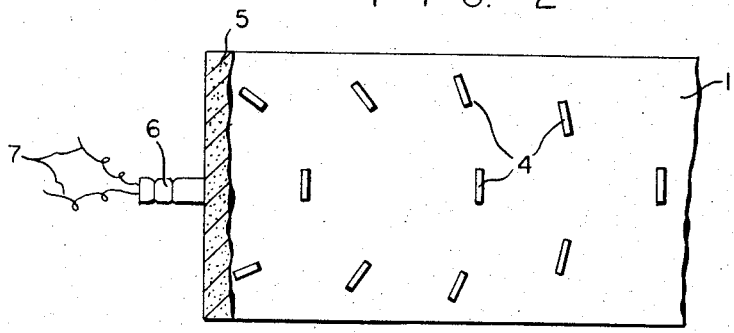
FIGURES 2 and 3 are partially sectioned top views of portions of assemblies which can be used to practice the invention.

In FIGURE 2, the standoff pieces 4 are rectangular strips arranged radially with respect to blasting cap 6, i.e., falling on arcs of successive circles emanating from the initiation point, with their width in the direction of the propagation of detonation. The staggered arrangement of strips 4 avoids the preponderance of strips on a number of successive arcs on any one radius from the initiation point.

Figure 3:
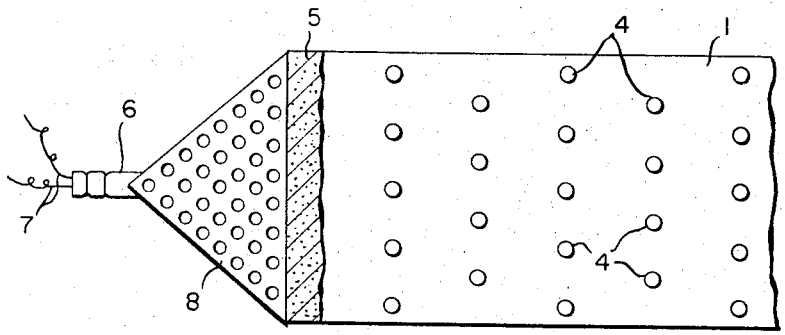

In FIGURE 3, the explosive layer is initiated simultaneously at a number of points along one edge by line-wave generator 8, which in turn is initiated by blasting cap 6. Standoff pieces 4 are circular disks aligned in staggered fashion in rows substantially parallel to the explosive initiation edge.

Figure 4:
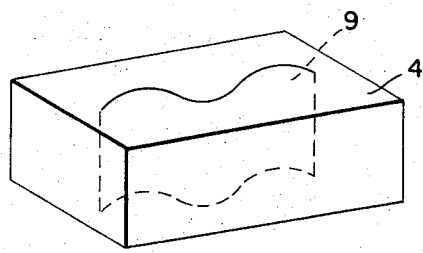
FIGURES 4 through 7 are plan views of metal-reinforced foamed plastic pieces which can be employed in an embodiment of the present process, particularly in cases in which extra resistance to compressive load is required.
Figure 5:
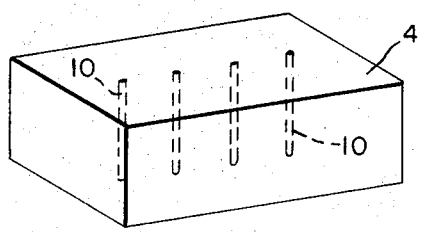
Figure 6:
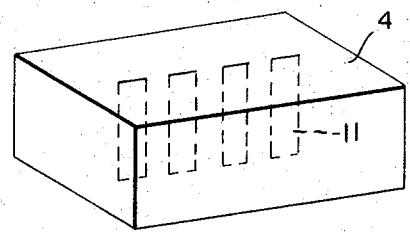

In FIGURES 4, 5, and 6, foamed plastic standoff strips 4 have thin metal bodies embedded in them through the thickness of the strips to provide added strength. In FIGURE 4, the embedded metal body is in the form of a thin metal ribbon 9 deformed into a sine wave configuration and pressed into the strip so that the edges are in the surfaces of the strip which are to contact the facing metal layer surfaces to be bonded, the width of the ribbon being equal to the thickness of the strip. In FIGURES 5 and 6, metal wires 10 and ribbons 11, respectively, extend lengthwise at intervals through the thickness of the foamed plastic strips 4.

Figure 7:
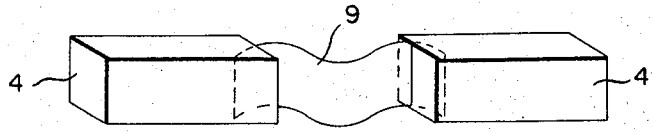
Figure 7:
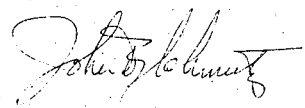

In FIGURE 7, thin metal ribbon 9, deformed into a sine wave configuration, has each of its ends embedded in a foamed plastic strip 4 in a manner such that the free edges of the ribbon lie in the same planes as the surfaces of the strips which are to contact the metal layer surfaces to be bonded, i.e., the width of the ribbon is equal to the thickness of the strips.

The minimum total surface area of foamed plastic which can be used in any specific case decreases as the compressive strength of the particular foam used and the permissible variation in standoff increases, and increases with the compressive load to which the foam is to be subjected. As a general rule, the total surface area of foamed plastic interposed between the facing surfaces of the metal layers preferably should not greatly exceed the minimum area required to prevent the compressive load to which the plastic foam will be subjected from producing more than an acceptable average deformation thereof, e.g., about 25%, and preferably 10%, deformation.

When the metal layers in the cladding assembly are arranged so that they stand on edge, e.g., edges of plates or ends of cylindrical layers, the foamed plastic serves chiefly as a space-maintaining element and is not required to support any significant compressive load. In such a case, small pieces of plastic foam between the metal layers at the outer edges of the assembly, e.g., near the corners or along the sides between metal plates, or near the ends of metal tubes, generally suffice. On the other hand, when the explosively driven metal layer is positioned parallel, or at a small angle, to a substantially horizontal metal layer, the driven layer and the explosive layer adjacent thereto exert a compressive force on the standoff material between metal layers. In such a case, the minimum total surface area of foamed plastic required to achieve the desired standoff is determined from the deformability of the foam under various loads per unit area. For example, from curves obtained by plotting load per unit area versus percent deformation or standoff for a particular plastic foam of a given thickness, one can find the load per unit area which results in an acceptable standoff or tolerable deformation and determine the area of foam required to give such load per unit area with the known total mass of explosively driven metal layer, e.g., a plate, and explosive. This is the minimum area to be used. This minimum area varies to some extent with the particular plastic foam used and its thickness. With materials such as "Styrofoam," loads of about 24 to 45 pounds per square inch produce a deformation of 10% over a foam thickness range of ⅛ to ½ inch. While a particular desired standoff can be achieved with more deformable foams by using thicker pieces, it generally is not preferred to exceed 25%, and usually 10%, deformation since an excessive increase in foam density may interfere with consumption of the foam during the cladding operation.

As was stated previously, the surface area of the plastic foam interposed between the facing surfaces of the metal layers preferably should not greatly exceed the minimum area required. If possible, the total surface area of foam preferably should not exceed about one-half the metal interface area, although, as has been stated, the use of a continuous layer of plastic foam between the metal layers over a major part of the facing surfaces of the layers can be employed, if desired, especially if the area of the layers to be bonded is not large.

The thickness of the plastic foam layer or pieces depends solely on the standoff desired, being uniform for substantially parallel metal layer assemblies, and variable for assemblies wherein the layers are assembled at an initial angle to one another. In parallel assemblies, the standoff employed is at least about 0.001 inch, and usually at least about 0.01 inch, and generally is about from 0.3 to 4 times the driven layer thickness. In angle-cladding assemblies, the standoff spacers are such as to maintain an angle up to 10° between the metal layers. Usually foam thicknesses greater than about one inch, and preferably one-half inch, will not be employed.

In the preferred embodiment of the present process wherein a number of standoff pieces are interposed between the metal layers to be bonded, the pieces preferably are of substantially the same shape and size and preferably are arranged in a relatively uniform manner. This leads to greater uniformity in the bond produced. Foam pieces of any desired shape can be used, e.g., pieces having a circular, semicircular, elliptical, square, rectangular, triangular, or other polygonal cross-section. Superior results with respect to the composition and geometry of the bond zone are obtained with rectangular strips, however, and these are preferred. The foamed plastic pieces preferably are arranged in rows in a staggered fashion. For example, if the explosive layer is initiated at a point, either at a corner or elsewhere along the edge or at an inside point, considering the initiation point as the center of a series of circles of increasing radius, distribution of the foam pieces so that they fall on a number of successive circles on any one radius preferably is avoided. If initiation of the explosive layer occurs at a number of points along a line simultaneously, distribution of the foam pieces so that they fall preponderantly on any line normal to the line of initiation preferably is avoided. The staggered arrangement can be accomplished by placing the pieces on a surface of one of the metal layers in rows which are parallel to the line of explosive initiation (as in FIGURE 3) or to any tangent to circles having the explosive initiation point as their center, and shifting the placement of the pieces in successive rows so that pieces in any two successive rows lie on different normals to said line or tangent. If point initiation is used, the rows of staggered pieces can be parallel to arcs of circles emanating from the initiation point, foam pieces in any two successive rows lying on different radii from said point. This embodiment is depicted in FIGURE 2.

When the foam pieces have two different dimensions in addition to thickness, e.g., when the pieces are elongated strips, they preferably are arranged with their largest dimension, e.g. the length of a rectangular strip, substantially perpendicular to the direction of detonation propagation, i.e., parallel to the line of initiation of the explosive layer, or falling substantially on the arcs of circles emanating from the initiation point as a center. In this manner, the movement of the detonation front is in the direction of a smaller dimension of the foam pieces.

In a preferred embodiment of the process of this invention, the standoff layer or pieces in the cladding assembly are separated from the point or line of initiation of the explosive layer, i.e., the foamed plastic preferably is not placed between the metal layers at the points of the layers which collide first. Thus, there is a certain "free distance" over which the collision region progresses prior to encountering the spacer material. The foamed plastic is consumed during the cladding process as a result of an interaction with the jet which forms in explosion cladding ("jetting" is described in the aforementioned U.S. Patent 3,137,937). The "free distance" of collision ensures the formation of sufficient jet material to produce this interaction. The particular "free distance" employed in any particular case depends on such factors as the dimension of the pieces in the direction of propagation of detonation, the density of the plastic foam, and the hardness and yield strength of the particular metals used, these properties affecting their jetting ability. Longer distances are used with larger and denser standoff pieces and with metals which are harder and have higher yield strength. With the use of a number of standoff pieces, it has been found satisfactory in many cases to use a "free distance" of 5 to 20, and preferably about 15 to 20, times the dimension of the standoff pieces in the direction of propagation of detonation, e.g., at least about 6 inches for 0.38 inch-wide standoff pieces.

With respect to the dimensions of the foam pieces, as a rule, the minimum dimension of the pieces in a plane normal to their thickness, e.g., the width of a rectangular strip, should exceed the thickness for ease of handling, although the thickness can be larger for pieces with curved edges. For example, for thicknesses greater than 0.12 inch, foam strips about 0.38 inch wide or less are preferred; in such thicknesses, disks about 0.80 inch or less, preferably 0.40 inch or less, in diameter can be used. When the pieces are less than 0.12-inch thick, strips about 0.20 inch wide, or disks about 0.40 inch in diameter are preferred, although narrower or smaller-diameter pieces can be employed. Preferably, the distance between pieces in the direction of propagation of detonation is at least about 5 to 20 times the dimension of the pieces in the same direction. Usually the dimension in the direction normal to the propagation of detonation is about 0.4 to 6 inches, although this dimension is not critical and the piece can be continuous in this direction to the edges of the layer.

The layer or pieces of rigid foamed plastic can be made of any one or more expanded or cellular plastics having rigidity as hereinbefore defined, for example, polystyrene, polyurethane, cellulosic, epoxy, phenilic, ureaformaldehyde, polyolefin, and 6,6- and 6,10-nylon foams, as well as other foamed or expanded thermoplastic and thermosetting organic polymeric materials. Preferred materials are those which have low density, e.g., 12 pounds per cubic foot or less, but usually greater than about 1 pound per cubic foot, and are not excessively fragile. For reasons of availability, foamed polystyrene and polyurethane are preferred, polystyrene being especially preferred because of its lower density. Any of the conventional methods known in the art for foaming and expanding plastics can be used to produce the products used herein to effect standoff. These include, for example, simultaneous polymerization and foaming as well as foaming and expanding preformed polymers. Foaming can be effected with volatile liquids as well as with chemical blowing agents conventionally used in the art.

The foamed plastic can be applied to the cladding assembly in a variety of ways. If the assembly is prepared and used with the metal layers in a substantially horizontal position, the foamed plastic layer or pieces can simply be set in place over the bottom metal layer and the second metal layer placed over them. If one continuous layer of foamed plastic is used in a vertical cladding assembly, the plastic need only be set in place between the metal layers. Usually, however, when a number of standoff pieces are used, either with the horizontal or vertical cladding technique, the pieces preferably are fixed in place on one metal layer by means of an adhesive.

Under certain circumstances, the load placed on the foamed plastic material in the standoff spacing may be extremely uneven due, for example, to excessive warping of the driven metal layer. In such cases, foamed plastic standoff pieces reinforced by embedding thin metal bodies therein can be employed either locally where the loads are higher or generally wherever the standoff pieces are to be placed. Reinforced pieces can comprise, for example, foamed plastic strips or disks having pieces of metal in the form of thin wire or ribbon, or thin-walled tubes embedded in the foam at intervals with their length in the direction of the thickness of the strips or disks, the lengths being equal to the thickness of the plastic piece and the required standoff (FIGURES 5 and 6). A particularly effective reinforced piece results when thin metal ribbons deformed into a sine wave, zig-zag, or twisted configuration, such as those described in the aforementioned U.S. Patent 3,205,574, are pressed into the plastic foam pieces and positioned so that they stand "on edge" between the metal layers (FIGURE 4); or when ribbons deformed in this manner have both ends embedded in the foamed plastic pieces, the resulting composite pieces also being positioned so that the ribbons stand "on edge" between the metal layers (FIGURE 7). With reinforced foamed plastic pieces of this kind, maximum strength is achieved with the use of relatively small amounts of metal, as compared with the amounts required with all-metal standoff techniques. At the same time, such reinforced pieces still retain the advantage of ease of application over previous standoff means, since glue or adhesive transfer tape can be used to affix them to the metal layers.

The process of this invention can be used to prepare clad products of a variety of shapes, e.g., plates, sheets, strips, rods, bars, tubing, etc., the nature of the plastic foam layer or pieces depending on the geometry of the cladding assembly used. For example, in cladding cylindrical surfaces, it is feasible to provide the foam layer in the form of a ring between the surfaces to be bonded, either near the ends of the assembly or also between the ends. Alternatively, the foam can be spirally wound around the inner cylindrical surface.

The improved explosion cladding process of this invention can be applied to a wide variety of metals including, for example, aluminum, iron, titanium, columbium, chromium, tantalum, cobalt, nickel, vanadium, zirconium, molybdenum silver, platinum, copper, gold, as well as alloys of a major proportion, e.g., 50% by weight or more, of one of the aforementioned metals with minor amounts of alloying elements. Metals of widely differing yield strength and hardness can be employed. The metal layers can be of the same composition, but usually will be of different composition. One or more of the layers to be bonded can be previously bonded multilayered composites, and two or more pairs of surfaces can be bonded simultaneously.

The desired properties in the explosive, as well as the techniques employed to initiate the explosive layers, prepare the metal surfaces, and otherwise effect the cladding process are described in the aforementioned U.S. Patent 3,137,937, and in U.S. Patents 3,233,312 and 3,264,731, the disclosures of which are incorporated herein by reference. The manner of positioning of the assembly is not critical, e.g., a plate assembly can be positioned with the plate farthest from the explosive resting on the ground or on a support material on or in the ground. In some instances, it is convenient to position the assembly so that the plates are standing on their edges (Example 17).

The following examples illustrate this invention.

*Example 1*

A titanium plate is clad explosively to a steel plate employing the general arrangement depicted in FIGURE 1. The backer plate 1 is a 12 x 96 inch Grade A–212–B steel (low-carbon or mild steel having a yield strength of 46,000 p.s.i.) plate 1 inch thick, and the cladder plate 2 is a 12 x 96 inch Grade 55–A titanium plate ⅛ inch thick. The layer of explosive 5 is a 70/30 nitroguanidine/corn meal mixture in a loading of 15.4 grams per square inch; the detonation velocity is 2200 meters per second. The standoff space 3 is 0.187 inch and is maintained by 62 circular disks of "Styrofoam," i.e., rigid foamed polystyrene, 0.187 inch thick and 0.800 inch in diameter. This foamed plastic has a density of the range of 1.8 to 4.3 pounds per cubic foot and a compressive strength of greater than 5 p.s.i. The total number of pieces used is such that 1 square inch of foam surface area (i.e., total area of foam in contact with each plate) is present for every 3 pounds of load (i.e., load is the total weight of the cladder plate and explosive layer). The explosive layer is initiated by a blasting cap positioned at the center of the short edge of the explosive layer (as in FIGURE 2), and the foam disks are arranged as shown in FIGURE 2. The distance between the point on the backer plate cor-

| Ex. No. | Cladder Plate Metal | Cladder Plate Size (inch) | Cladder Plate Thickness (inch) | Backer Plate Metal | Backer Plate Size (inch) | Backer Plate Thickness (inch) | Initiation of Explosive Layer | Standoff Pieces[1] Thickness (inch) | Standoff Pieces[1] Shape | Standoff Pieces[1] Arrangement | Additional Features |
|---|---|---|---|---|---|---|---|---|---|---|---|
| 2 | 35-A Ti | 12 x 18 | 0.078 | SS-100 steel | 12 x 18 | 1.279 | Blasting cap at corner | 0.160 | Rectangular | Radial | Thin coating of plastic film on Cu surface adjacent explosive. |
| 3 | Cu | 6 x 12 | 0.125 | 1100-H14 Al | 6 x 12 | 0.125 | do | 0.105 | do | do | Thin coating of plastic film on Cu surface adjacent explosive; Cu supported above steel from edge to center to clad ½" steel surface. |
| 4 | Cu | 5 x 11.75 | 0.125 | A-212-B steel | 10 x 11.75 | 1.5 | do | 0.070–0.100 | Round disk | do | 0.250" layer of "Styrofoam", and 0.020" steel sheet between Cu and explosive; 0.5" steel base between assembly and ground. |
| 5 | Cu | 6 x 6.25 | 0.017 | Mo | 6 x 6 | 0.030 | Blasting cap at center of 6" edge. | 0.070–0.080 | Rectangular | do | Thin coating of plastic film between Cu and explosive. |
| 6 | Cu | 6 x 10 | 0.030 | Mo | 6 x 10 | 0.060 | Line wave generator at 6" edge. | 0.080 | do | Linear | Thin coating of plastic film between Mo and explosive. |
| 7 | Mo | 6 x 12 | 0.060 | Cu | 6 x 12 | 0.125 | do | 0.060 | do | do | |
| 8 | 304L Stainless Steel | 12 x 18 | 0.125 | SSS-100 steel | 12 x 18 | 1.0 | Blasting cap at corner | 0.125 | do | Radial | |
| 9 | A-285 Steel | 6 x 6 | 0.225 | A-285 steel | 6 x 6 | 0.225 | do | 0.250 | 4 blocks 0.375" square, one at center of each edge. | | |
| 10 | Ni | 6 x 12 | 0.021 | 3003-F Al | 6 x 12 | 1.0 | Line wave generator at 6" edge. | 0.040 | Rectangular | Linear | 0.030" steel sheet between Ni and explosive; 0.250" Masonite base. |
| 11 | 304L Stainless Steel | 6 x 12 | 0.125 | Product of Ex. 10, Ni side facing steel. | 6 x 12 | ~1.0 | Blasting cap at corner | 0.090 | do | Radial | 0.250" Masonite and 0.500" plywood base. |
| 12 | Ta (2 pieces) | [2] 3 x 12 | [2] 0.060 | A-212-B steel | 12 x 12 | 1.0 | Blasting cap at corner of each explosive layer (1 on each Ta plate). | 0.050–0.060 | do | do | Thin coating of plastic film between Ta and explosive. Ta Plates supported above steel at edges to leave center 6" of steel unclad. |
| 13 | Inconel | 24 x 48 | 0.078 | A-212-B steel | 24 x 48 | 0.5 | Blasting cap at corner | 0.125 | Round disk | do | Thin coating of plastic film between platinum surface and explosive. |
| 14 | Platinum | 15 x 23 | 0.040 | Columbium | 15 x 33 | 2.0 | Line wave generator at 15" edge. | 0.060 | do | Linear | |
| 15 | Ti/Al clad (Ti side facing in). | 5 x 10 | 0.125 | Ti/Al clad (Al side facing in). | 5 x 10 | 0.125 | Blasting cap at center of 5" edge. | 0.080–0.090 | Rectangular | Radial | Thin layer of plastic film between cladder and explosive; 0.5" steel base. |

[1] Expanded polystyrene described in Example 1 in all examples except Examples 3 and 9 in which polyurethane (density ranges from 1.5 to 12.0 pounds per cubic foot, compressive strength >5 p.s.i.) is used.
[2] Each.

responding to the initiation point of the explosive layer and the first row of disks is 6 inches, and the distance between rows of disks is 6 inches. The disks are applied to the backer plate by means of an adhesive.

After detonation of the explosive, a specimen is cut out of the resulting bonded composite for metallographic examination of the bond zone. The interface is greater than 90% metallurgically bonded, and no evidence of entrapment of the foamed polystyrene is seen.

Similar results are obtained if phenolic foam having a density of about 5 lbs./ft.$^3$ and a compressive strength of greater than 5 p.s.i. is substituted for the expanded polystyrene in the above example.

*Examples 2–15*

The procedure described in Example 1 is repeated with variations in plate metals, standoff pieces, and manner of initiation of the explosive layer. In each example the detonation velocity is in the range of about from 2000 to 2500 meters per second. Whenever rectangular strips of foam are used, they are about 0.250 inch by 0.500 inch and are arranged with their lengths parallel to the detonation front, e.g., as in FIGURE 2. Round disks of foam are about 0.800 inch in diameter. In all cases, metallographic examination of the bond zone in the clad composite reveals over 90% of the interfacial area metallurgically bonded, and no entrapment of foreign material. The conditions are given in the preceding table.

*Example 16*

The procedure described in Example 1 is repeated with the following changes: The cladder plate is a 10 x 120-inch type 304 stainless steel plate 0.125-inch thick and the backer plate is 10 x 120 inch Grade A-212-B steel plate one inch thick. The standoff is maintained by strips of the expanded polystyrene shown in Example 1, 0.375 inch wide, 10 inches long, and 0.125 inch thick placed with their lengths parallel to the 10-inch edge of the plate assembly at 6-inch intervals for the entire length of the plates. The explosive layer is initiated at the center of the 10-inch edge, i.e., the edge overlying the 10-inch edge of the cladder plate. Uniform bonding without entrapment of the foamed plastic in the bond zone is obtained.

*Example 17*

A three-layered clad composite consisting of an inner layer of steel clad on each side with a layer of cupronickel (70/30 Cu/Ni) is made as follows:

The steel layer is a 9 x 12 inch plate of low carbon steel (AISI 1010) 0.250-inch thick. The cupronickel layers are 9 x 12 inch plates 0.083 inch thick. Rectangular pieces of expanded polystyrene such as that described in the preceding examples, 0.070 inch thick, 0.187 inch wide, and 0.5 inch long are affixed to the cupronickel plates at each of their four corners. Each of the three plates is placed on a 12-inch edge with the standoff pieces contacting the steel plate. Support rods are welded to the 12-inch base of the steel plate to support the assembly in the vertical position. A layer of explosive of identical loading and detonation velocity is placed adjacent the free surface of each cupronickel plate, and both layers are initiated simultaneously by means of a blasting cap in each layer at the center of the 9-inch edge. The detonation velocity is 2190 meters per second. The three-layered composite is uniformly bonded metallurgically over greater than 90% of the interface, and shows no evidence of foam entrapment.

*Example 18*

The procedure described in Example 1 is applied to explosively cladding a 6 x 12 inch Grade 55-A titanium plate having a thickness of 0.125 inch to a 6 x 12 inch Grade A-212-B steel plate having a thickness of 0.5 inch, the standoff in this case being provided by a 6 x 10 inch piece of polyurethane foam positioned between the plates, a 6-inch edge being flush with 6-inch edges of the plates. This leaves a 2 x 6 inch area of each of the facing plate surfaces with no spacing material between surfaces. The layer of foam is 0.125 inch thick and has a density of about 2 lbs./ft.$^3$ and a compressive strength of greater than 5 p.s.i. The explosive layer is initiated at the center of the 6-inch edge above the cladder plate edge where no foam is interposed. The detonation velocity is 2030 meters per second. Metallurgical bonding is effected over greater than 90% of the interfacial area between plates. No evidence of entrapped foam is obtained.

Similar results are obtained when the layer of polyurethane is replaced by a corresponding layer of the aforementioned polystyrene or with foamed 6-nylon formed by the simultaneous foaming and anionic polymerization of caprolactam.

*Example 19*

An 18-inch long type 321 stainless steel tube having an outer diameter of 2.250 inches and an inner diameter of 1.875 inches (0.187-inch wall thickness) is explosively clad onto the outside surface of an 18-inch long columbium tube having an outer diameter of 1.500 inches and an inner diameter of 1.300 inches (0.100-inch wall thickness) as follows:

The columbium tube is sealed with a plug at one end, filled with water, and sealed with a plug at the other end. A ring of the expanded polystyrene previously described, 0.187 inch high and having an inner diameter of 1.500 inches and an outer diameter of 1.875 inches (0.187-inch wall thickness), is positioned over the columbium tube, one at each end, and the steel tube is positioned over the polystyrene rings. Thus the tubes are maintained in coaxial position with a 0.187-inch standoff spacing between facing tube surfaces. A layer of explosive having a uniform loading and a detonation velocity of 2150 meters per second is positioned around the steel tube. The assembly is positioned horizontally on the ground, and the explosive layer is initiated simultaneously along one edge at one end of the assembly by means of a line wave generator, the detonation being propagated progressively in a direction parallel to the longitudinal axis of the tubes. After detonation, the tubes are found to be metallurgically bonded over more than 90% of the interfacial area; there is no entrapment of foreign material in the bond zone.

*Example 20*

The procedure of Example 19 is repeated with the exception that an outside tube of 1015 mild steel having an outer diameter of 2.500 inches and an inner diameter of 1.750 inches is clad onto a titanium rod having a diameter of 1.250 inches. The wall thickness of the polystyrene rings (i.e., the standoff spacing) is 0.250 inch. The detonation velocity of the explosive is 2250 meters per second. After detonation, the tube is metallurgically bonded over more than 90% of the interfacial area, and there is no entrapment of foreign material in the bond zone.

*Example 21*

A nickel plate is clad explosively to a steel plate employing the procedure described in Example 1. The backer plate 1 is a 7 x 9 inch Grade 1008 steel plate 0.5 inch thick, and the cladder plate 2 is a 7 x 9 inch nickel plate 0.125 inch thick. The standoff space is 156 mils and is maintained by four metal-reinforced expanded polystyrene strips of the type shown in FIGURE 4. The plastic strips are 0.5 inch long, 0.25 inch wide, and 0.156 inch thick; the metal ribbon is made of steel, and has a width of 0.156 inch and an overall length of 0.375 inch. The explosive layer detonates at a velocity of 2260 meters per second, and is initiated by a line-wave generator at one of the 7-inch edges, as in FIGURE 3. The four plastic strips are arranged between the plates with their lengths parallel to the line of initiation, two of the strips being aligned at a distance of 3 inches from the line of initiation, and the other two aligned parallel to the first two at a distance of one-inch from the plate edge opposite the initiation edge. The total weight of the explosive and line-wave generator is 1490 grams. The clad composite obtained is 100% metallurgically bonded, except for a 0.5 inch strip at the initiation side, with no evidence of foam entrapment.

I claim:

1. In the process for metallurgically bonding metal surfaces which comprises providing a standoff between each pair of surfaces to be bonded then driving said surfaces together progressively with an explosive, the improvement which comprises interposing rigid foamed plastic between said surfaces to provide said standoff, said plastic having a density of less than about 12 pounds per cubic foot and a compressive strength of at least about 5 pounds per square inch.

2. A process of claim 1 wherein said plastic is polystyrene.

3. A process of claim 1 wherein said plastic is polyurethane.

4. A process of claim 1 wherein said plastic is metal-reinforced.

5. A process of claim 1 wherein said plastic is in uniformly spaced apart units covering a total of less than about 50% of the interfacial area to be bonded.

6. A process of claim 5 wherein said plastic is spaced apart from the region of initiation of said explosive.

References Cited

UNITED STATES PATENTS

| 3,137,937 | 6/1964 | Cowan et al. | 29—497.5 |
| 3,205,574 | 9/1965 | Brennecke | 29—497.5 |

JOHN F. CAMPBELL, *Primary Examiner.*

P. M. COHEN, *Assistant Examiner.*